March 31, 1953 H. H. RING 2,633,400
RACK AND RACK SUPPORT ASSEMBLY
Filed Feb. 27, 1950 2 SHEETS—SHEET 1
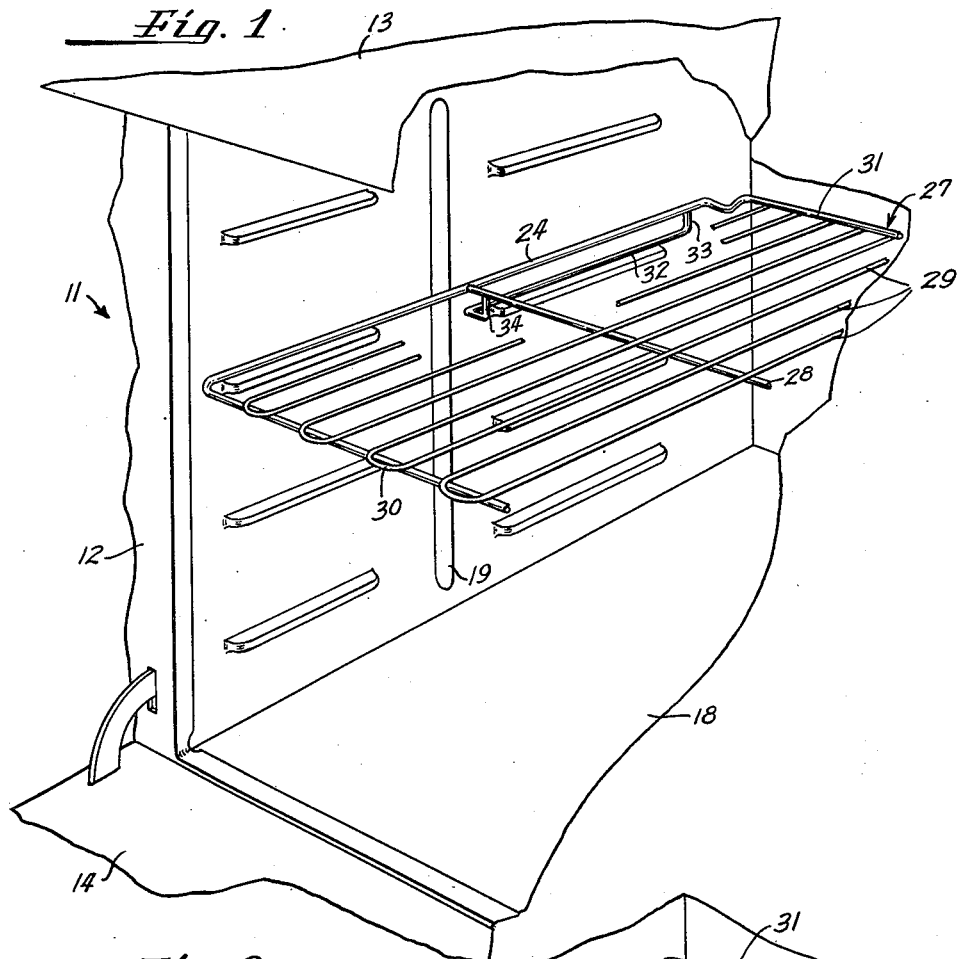
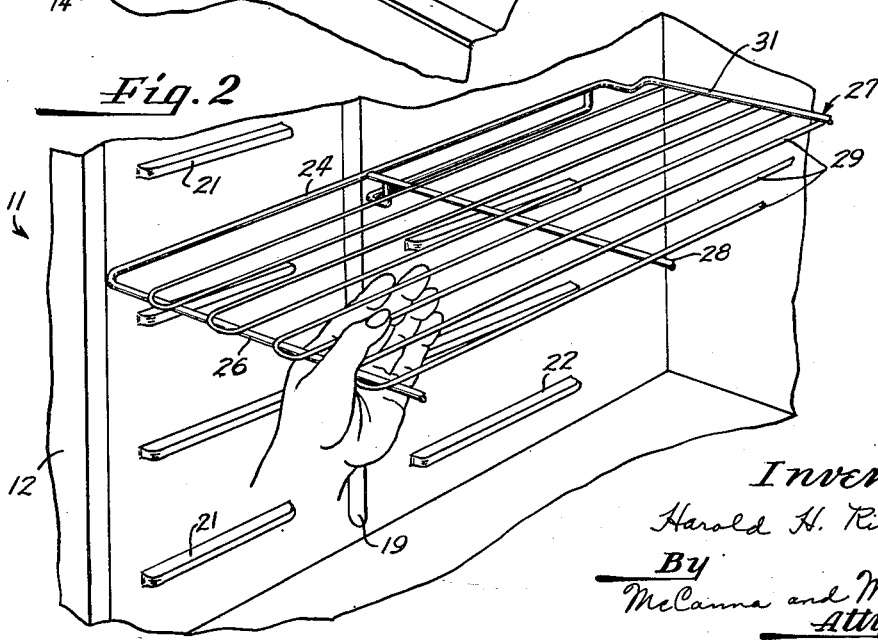
Inventor
Harold H. Ring
By
McCanna and Morsbach
Attys.

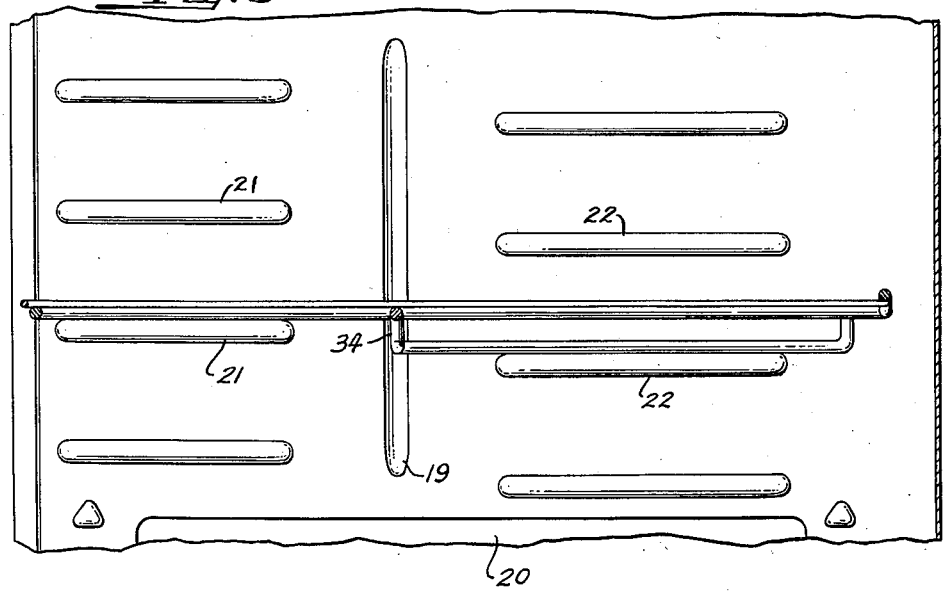
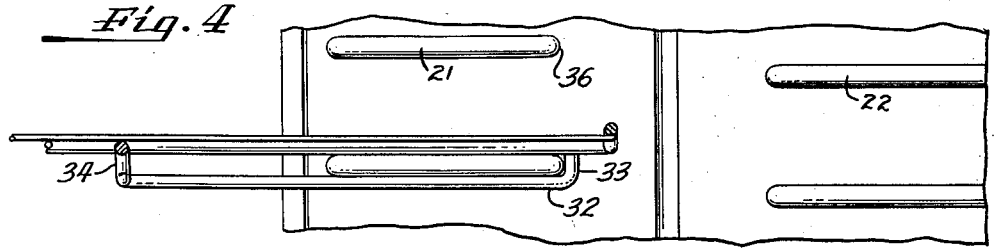

Patented Mar. 31, 1953

2,633,400

UNITED STATES PATENT OFFICE 2,633,400

RACK AND RACK SUPPORT ASSEMBLY

Harold H. Ring, Rockford, Ill., assignor to Geo. D. Roper Corporation, Rockford, Ill., a corporation of Illinois Application February 27, 1950, Serial No. 146,418

6 Claims. (Cl. 312—346)

This invention relates to a combined rack and rack support assembly and more particularly to an oven and rack assembly for a gas range.

An object of the invention is the provision of a novel rack and rack support assembly wherein the rack may be readily inserted and removed from the rack support, is self aligning with the rack support, may be readily moved between retracted and extended positions and when in the extended position is locked so that it cannot be accidentally removed from the rack support or tilted thereabout and cannot be incorrectly mounted on the rack support without the same being readily noticeable by the operator.

Another object of the invention is the provision of a rack and rack supports that are free from sharply pointed projecting surfaces.

Another object of the invention is the provision of a rack and rack support assembly that has a neat looking appearance, that is easy to clean by straight line wiping, that is rugged, that is simple to construct and that is relatively inexpensive to produce.

Other objects and advantages of the invention will become apparent from the following detailed description taken in connection with the accompanying drawings, in which—

Figure 1 is a fragmentary perspective view of a gas range having an oven and rack assembly embodying the present invention;

Fig. 2 is a view similar to Figure 1 showing the position of the rack in the oven as it is being inserted or removed therefrom;

Fig. 3 is a sectional view of the oven and rack assembly with the rack in its retracted position;

Fig. 4 is similar to Fig. 3 with the rack in its extended position;

Fig. 5 is an end view of Fig. 3, and

Fig. 6 shows the details of construction of attaching the auxiliary supports to the bottom of the rack.

The invention is shown embodied in an oven and rack assembly for a conventional gas range 11 of which only the front 12 and top 13 are shown to simplify the drawings. The oven is mounted in the gas range in a conventional manner to be behind an oven door 14 hinged to the front 12 of the range. In general the oven includes a pair of opposed side walls 16 and 17, a bottom 18 and a top, not shown, formed of suitable sheet metal material. To increase the rigidity of the side walls 16 and 17, outwardly facing vertical and horizontal extending projections or crimps 19 and 20 may be formed on the central portion of the side walls as shown in Figure 3.

Projecting inwardly from the side walls 16 and 17 are spaced rack supports or projections 21 and 22 adjacent the front and back of the oven, as shown. The projections 21 and 22 are of substantial length with the rear projections 22 being slightly longer than the front projections 21. The projections are disposed so that their top and bottom surfaces are in parallel relation with the bottom of the oven and the ends are rounded. As best seen in Fig. 3 the rear projections 22 are disposed slightly below the corresponding forward projections 21. It is to be understood that each projection 21 and 22 may also comprise a plurality of smaller projections in alignment where desired.

The rack is in the form of a wire grid and includes spaced sides 24, a front crosspiece 26, a back crosspiece 27 formed by a single piece of wire or circular rod deformed to a generally rectangular shape. A central crosspiece 28 intermediate the front 26 and back 27 is connected to the sides 24 to increase the rigidity of the rack. Spaced elongated slats 29, of smaller diameter than the stock used for forming the sides 24, front 26 and back 27, extend lengthwise of the rack and have their forward portions rest on the front and center crosspieces 26 and 28 and have their extreme rear ends beneath a central portion 31 of the back 27 deformed out of the plane of the front and center crosspieces 26 and 28 to provide an upstanding rib on the top of the rack adjacent the rear edge to aid in retaining items on the rack. The forward ends of each pair of slats 29 are interconnected with a rounded bridging portion 30 to provide a forward edge having a clean appearance free from sharp pointed projections. Spaced immediately below the back portions of the sides 24 are members or auxiliary side supports 32 formed from suitable wire or rod stock. The sides and auxiliary supports are spaced apart sufficiently to receive the forward projection 21 therebetween as seen in Fig. 4. For this purpose the rear end portion of each support 32 is deformed to define a vertical riser 33 for attaching the auxiliary support to the rack. The forward end of each support 32 is deformed to define a vertical riser 34 for connecting the forward end of each auxiliary support 32 to the center crosspiece 28 at a position spaced inwardly from the sides of the rack, this being effected by inclining the forward portion of the auxiliary support 32 adjacent the riser 34 inwardly of the edge of the rack as best shown in Fig. 6.

The rack may be readily installed in the oven. Thus, to place the rack in the oven the user inserts the rack into the oven in an endwise manner as shown in Fig. 2 between a preselected pair of forward projections 21 and then pushes the rack into the oven until the side supports 32 rest on top of the projections 22 and the forward portion of the sides 24 rest on the top of the projections 21 as shown in Fig. 3. The rack is of such shape and configuration that as soon as it is pushed to the retracted position it automatically aligns itself on the rack supports. The difference in levels between the projections 21 and 22 and the spacing between the sides 24 and the auxiliary supports 32 are coordinated so that when the rack is in the position shown in Figs. 1 and 3 the rack is in a substantially horizontal position and provides a cooking support at a preselected level within the oven. Fig. 4 shows the rack in its extended position with the forward portion of the rack extending outwardly of the range for reception of pans and the like and the back portion of the rack interlocked with the projections 21 so that the rack cannot be accidentally withdrawn from the oven or tilted with respect thereto. To interlock the rack in its extended position the back portion of the sides 24 rest on the top of the front projections 21 and the auxiliary supports 32 are beneath the projections 21. The forward movement of the rack is determined by engagement of the back risers 33 with the rear ends 36 of the front projections 21. Thus, the back portion of the sides, the auxiliary supports and risers in effect define an open sheath structure for receiving the projections 21 that interlocks therewith to prevent accidental tilting or withdrawal of the rack from the oven. With the aforegoing structure the only possible movement of the rack from the position shown in Fig. 4 is to its retracted position shown in Fig. 3.

To remove the rack the latter is moved to the position shown in Fig. 3 and the forward end of the rack is inclined so that the bottom edges of the auxiliary supports 32 can engage the back ends 36 of the front projections 21 as the rack is pulled outwardly. As a result, the rack is caused to slide up over the front projections 21 thereby permitting the rack to be removed from the oven.

One advantage of this rack construction is that all the corners of the rack are rounded and consequently there are no sharp projections extending outwardly from any surface of the rack. Another advantage is that the rack may be cleaned by straight line wiping motions. Also the rack may be readily inserted and removed from the oven and cannot be incorrectly placed in the oven without the latter being immediately apparent to the operator. This construction is simple and rugged and may be readily formed and provides a positive support both in its retracted and in its extended position. The projections 21 and 22 on the side walls also are rounded and present smooth clean surfaces without sharp corners so that the projections too can be readily cleared by straight line wiping. The projections also serve to stiffen the side walls of the oven and thereby assure a very rigid structure.

While I have shown one embodiment of my invention it will be understood that I do not wish to be limited thereto since many modifications may be made and I therefore contemplate by the claims to cover such modifications as fall within the true spirit and scope of my invention.

I claim:

1. The combination of opposed spaced side walls, inwardly facing projections adjacent the front and back of the side walls, the projections adjacent the back of the side walls being disposed below the associated projections adjacent the front of the side walls, a rack receivable between said side walls and movable between a retracted and an extended position, said rack having opposed sides shaped to rest on the projections at the front of the spaced side walls when the rack is in its retracted position and slidable over said projections when the rack is moved to its extended position, and support members spaced below the back portion of the sides of the rack, said support members in the retracted positions of the rack shaped to rest on the projections adjacent the back of the side walls to support the rear end of the rack at substantially the same elevation as the front end of the rack and shaped to be disposed below the front projections on which the sides rest when the rack is in its extended position to provide with the sides an open sheath structure shaped to interlock with said first projections to prevent tilting of the rack.

2. The combination of an oven having opposed side walls, inwardly facing elongated horizontally extending projections of substantial length on said side walls adjacent the front and back of the oven, the projections adjacent the back of the oven being disposed at a lower level on the side walls than the associated projections adjacent the front of the oven, a rack receivable between said side walls having opposed sides shaped to rest on the projections at the front of the oven and slidable thereover and auxiliary support members spaced beneath the sides at the back of the rack, said support members shaped to rest on the projections adjacent the back of the oven to support the rear end of the rack at substantially the same elevation as the front end of the rack and shaped to be disposed below the front projections to be engageable therewith to prevent tilting of the rack when the latter is in an extended position.

3. The combination of an oven having opposed side walls, inwardly facing elongated horizontally extending projections of substantial length on said side walls adjacent the front and back of the oven, the projections adjacent the back of the oven being disposed below the associated projections adjacent the front of the oven, a rack receivable between said side walls having opposed sides shaped to rest on the projections at the front of the oven and support members spaced beneath and parallel with the sides on the rear portion of the rack, said support members in the retracted position of the rack shaped to rest on the projections adjacent the back of the oven to support the rear end of the rack at substantially the same elevation as the front end of the back and shaped to be disposed below the front projections to be engageable therewith to prevent tilting of the rack when the latter is in an extended position, and means on said rack engageable with the front projections to limit outward movement of the rack and define the latter's extended position.

4. The combination of an oven having opposed side walls, rack support means formed on said walls adjacent the front and back of the oven to project inwardly of the oven, said rack support means at the back of the oven being disposed below the associated rack support means adjacent the front of the oven, a rack receivable in said oven and movable between an extended position in which it projects outwardly of the oven and a retracted position in which it is disposed wholly within the oven, said rack having sides in a common plane extending from the front to the back of the rack and a member spaced below and parallel with each side of the rack adjacent the back thereof, said rack shaped to permit the forward part of the rack to rest on the front rack support means and the member below the rack to rest on the back rack support means to support the rack in a horizontal position when said rack is in its retracted position and to have the sides of the rack and the members spaced below the sides on opposite sides of the front rack support means and engageable therewith to prevent tilting of the rack when the rack is in its extended position, and means for spacing said members below the rack engageable with the front rack support means to define the extended position of the rack.

5. The combination of opposed side walls, rack support means formed on said walls adjacent the front and back of the side walls, said rack support means adjacent the back of the side walls being disposed below the rack support means adjacent the front of the side walls, a rack receivable between said walls and movable between an extended position in which it projects outwardly from between said side walls and a retracted position in which it is disposed wholly between said side walls, said rack having a front, a back and sides extending from the front to the back formed from suitable wire stock and a member of wire stock spaced below and generally parallel with each side of the rack adjacent the back portion thereof, the rear end of each of said members being deformed to form a riser connecting the rear end of each member with a side and the forward end of each member being deformed to define a riser spaced inwardly of the sides for connecting the forward end of each member to a central portion of the rack, said sides and members shaped to rest on the rack support means at the front and back of the side walls to maintain the rack in a horizontal position when the rack is in its retracted position and said rack shaped to have the sides and the members spaced therebelow on opposite sides of the front rack support means and engageable therewith to prevent tilting of the rack, and said risers at the back of the rack shaped to engage the forward rack support means to limit outward movement of the rack and define the extended position thereof.

6. The combination of opposed spaced side walls, inwardly facing, elongated, horizontally extending, spaced apart projections of substantial length on said side walls adjacent the front and back thereof, the projections on the respective side walls adjacent the back thereof being at the same level with one another and the projections on the respective side walls adjacent the front thereof being at the same level with one another and disposed higher than said back projections, and a rack receivable between said side walls and movable between retracted and extended positions, said rack including spaced sides shaped to rest on the front projections and slidable thereover, said rack also including support members at each side of the rack each comprising an elongated horizontal rail extending below the adjacent side edge of the rack parallel thereto and in alignment therewith, said support rails being disposed adjacent the rear of the rack and being disposed below the sides of the rack a distance equal to the difference in height between the front and back projections on the side walls and being shaped to rest on the back projections on the side walls to support the rear of the rack at the same level as the front of the rack in the retracted position of the rack, each said support member on the rack also being formed with a riser extending upwardly from the rear end of the horizontal rail at the respective side edge of the rack to interconnect said rail and said side of the rack and being formed with a riser interconnecting the forward end of the rail and the rack and offset inwardly from the adjacent side of the rack a distance greater than the inward extent of the front projections on the side walls, said rack in its extended position having its sides resting on the front projections on the side walls and the rails disposed snugly beneath the front projections and the rear upwardly-extending risers abutting against the rear of the front projections to limit the extended movement of the rack.

HAROLD H. RING.

REFERENCES CITED

The following references are of record in the file of this patent:

UNITED STATES PATENTS

| Number | Name | Date |
| --- | --- | --- |
| 2,011,139 | Anderson | Aug. 13, 1935 |
| 2,086,118 | Chadwick | July 6, 1937 |
| 2,101,582 | Hoff | Dec. 7, 1937 |
| 2,168,172 | Rees | Aug. 1, 1939 |